(12) United States Patent
Iriguchi et al.

(10) Patent No.: US 6,169,136 B1
(45) Date of Patent: Jan. 2, 2001

(54) THERMOSETTING RESIN POTTING COMPOSITION

(75) Inventors: Jiro Iriguchi, Kakogawa; Yasuhiro Yamamoto, Himeji; Hideki Oishi, Himeji; Shuji Shimizu, Himeji, all of (JP)

(73) Assignee: Nippon Shokubai Co., Ltd., Osaka (JP)

( * ) Notice: Under 35 U.S.C. 154(b), the term of this patent shall be extended for 0 days.

(21) Appl. No.: 09/134,564

(22) Filed: Aug. 14, 1998

(30) Foreign Application Priority Data

Aug. 18, 1997 (JP) .................................................. 9-221382
Jul. 23, 1998 (JP) ................................................ 10-208256

(51) Int. Cl.[7] .................................................... C08K 3/00
(52) U.S. Cl. ......................... 524/492; 524/493; 524/494
(58) Field of Search .................................. 524/494, 492, 524/493

(56) References Cited

U.S. PATENT DOCUMENTS 5,338,353    8/1994    Uchino et al. .

FOREIGN PATENT DOCUMENTS 5-205901    8/1993    (JP) .
5-86251    12/1993    (JP) .
7-157543  * 6/1995    (JP) .

* cited by examiner

Primary Examiner—Edward J. Cain
(74) Attorney, Agent, or Firm—Oblon, Spivak, McClelland, Maier & Neustadt, P.C.

(57) ABSTRACT

The present invention provides a thermosetting resin potting composition with low melt viscosity and good flowability even though it contains large amount of an inorganic filler containing sphere silica powder as a main component. With this construction, the present invention has solved the problem residing in the prior art that, when the content of an inorganic filler is increased, the viscosity of a potting composition is increased and its flowability is lowered.

In the present invention, the sphere silica particles in the inorganic filler have at least one particle group, and the particle group has an average particle diameter of 0.01 to 10 $\mu$m and a coefficient of particle diameter variation of 10 percent or smaller. More preferably, the sphere silica particles have two or more particle groups. In this case, the average particle diameter of the larger particle group is 1.4 times or larger than that of its adjacent and smaller particle group.

16 Claims, No Drawings

THERMOSETTING RESIN POTTING COMPOSITION

BACKGROUND OF THE INVENTION

The present invention relates to a thermosetting resin potting composition for highly-integrated semiconductor devices to form a protective layer thereon.

In order to protect large-sized semiconductor chips such as large scale integrated circuits (LSI) and very large scale integrated circuits (VLSI) from moisture and the like, a thermosetting resin potting composition is applied to form a protective layer. In case a thermal expansion ratio of the thermosetting resin potting composition is quite different from that of the semiconductor chip, thermal stress is generated therebetween at the heating step after the application of the potting composition, and the thermal stress may damage the semiconductor chip. In order to suppress the thermal stress as small as possible, the thermosetting resin potting composition is required to have a thermal expansion ratio close to that of the semiconductor chips. In other words, the thermosetting resin potting composition is required to have a low thermal expansion ratio. The thermal expansion ratio of the thermosetting resin potting composition can be successfully lowered by increasing the content of the inorganic filler in the thermosetting resin potting composition. However, in this case, there is a problem as follows. That is, when the content of the inorganic filler in the potting composition is increased, the melt viscosity of the potting composition is also increased, and as a result, the flowability of the potting composition is lowered. The potting composition with low flowability cannot be satisfactorily applied onto the surface of the semiconductor chips. In order to solve this problem, various attempts have been conducted to increase a packed density of the inorganic filler without increasing its viscosity. For example, there has been an attempt that sphere silica particles are contained in the inorganic filler. There has been another attempt that sphere silica particles with particles having a continued particle size distribution are contained in the inorganic filler. However, these attempts have not been successful.

SUMMARY OF THE INVENTION

The present invention was made to overcome the problem residing in the prior art that the potting composition has poor flowability when its melt viscosity is increased by increasing the content of the filler containing sphere silica particles.

Therefore, it is an object of the present invention to provide a thermosetting resin potting composition which has a low thermal expansion ratio by increasing the content of the inorganic filler containing sphere silica particles, while having low melt viscosity and good flowability.

According to an aspect of the present invention, a thermosetting resin potting composition includes an inorganic filler containing silica powder as a main component. The silica powder comprises at least one particle group with respect to a particle size distribution, and the particle group has an average particle diameter of 0.01 to 10 $\mu$m, and a coefficient of particle diameter variation of 10 percent or less.

DETAILED DESCRIPTION OF THE PREFERRED EMBODIMENT OF THE INVENTION

In general, a thermosetting resin potting composition has a low thermal expansion ratio when it contains large amount of an inorganic filler. However, it has been considered to be difficult to give excellent flowability to the potting composition when it contains large amount of inorganic filler. In order to solve this problem, the present inventors have conducted hard studies, and have found that it is possible to give excellent flowability to a thermosetting resin potting composition even if it contains large amount of an inorganic filler. This has been attained by using an inorganic filler containing sphere silica particles with sharp distribution in particle size.

Preferably, the sphere silica particles have two or more particle groups with respect to a particle size distribution. In the particle size distribution, it is more preferable that the average particle diameter of the larger particle group is 1.4 times or larger than its adjacent smaller particle group.

The preferable content of the inorganic filler is 60 to 90 weight percent of the total weight of the thermosetting resin potting composition. The preferable content of the sphere silica powder is 5 to 100 weight percent of the total weight of the inorganic filler.

The sharpness of the particle size distribution is expressed by a coefficient of particle diameter variation obtained from the following formula:

Coefficient of particle diameter variation (%)=(standard deviation/average value)×100

As sharper the particle size distribution of the sphere silica particles becomes, the melt viscosity of the potting composition can be lowered, even if the use amount of inorganic filler is increased. As a result, the potting composition has better flowability. In the present invention, the coefficient of particle diameter variation of the sphere silica particle groups should be 10 percent or less, and preferably 8 percent or less, and more preferably 6 percent or less.

When the average particle diameter is too small, the thermosetting resin potting composition has poor strength. Therefore, the minimum average particle diameter of the particle group should be 0.01 $\mu$m, and preferably 0.03 $\mu$m, and more preferably 0.05 $\mu$m. On the other hand, when the average particle diameter is too large, the thermosetting resin potting composition in the form of liquid does not sufficiently enter the minute spaces of 50 $\mu$m or smaller of the surface of the semiconductor chip. Therefore, the maximum average particle diameter thereof should be 10 $\mu$m, and preferably 5.0 $\mu$m, and more preferably 3.0 $\mu$m.

Preferably, sphere silica particles have a complete sphere shape as round as possible. The sphericity of the particles is expressed by a ratio of the longest particle diameter against the shortest particle diameter. Assuming that the particle has a complete sphere shape, the ratio is 1.00. When inorganic filler containing large amount of the sphere silica particles with the ratio of larger than 1.20 is used, the melt viscosity of the thermosetting resin potting composition is increased, and as a result, its flowability becomes poor. Therefore, the ratio is desired to be 1.00 to 1.20, and preferably 1.10 or less, and more preferably 1.05 or less.

The thermosetting resin potting composition additionally has high strength and humidity resistance when the sphere silica particles in the inorganic filler comprise two or more particle groups with different average particle diameters from each other. In this case, two or more raw material sphere silica particles are mixed with each other. Specifically, in accordance with the required strength of the potting composition, the average particle diameter of the sphere silica particles to be a main component of the filler is determined. Then, another sphere silica particles having smaller average particle diameter are selected, and mixed with the main component. In the mixed sphere silica particles, the spaces between the larger particles are filled with the smaller particles, whereby the packed density of the filler is increased. Thus-obtained filler gives high strength and humidity resistance to the potting composition. For example, when the main component of an inorganic filler is sphere silica particles with an average particle diameter of 1.5 μm, higher strength is obtained by being mixed with another sphere silica particles having an average particle diameter of 0.3 μm, as compared with the case where the sphere silica particles of the main component are used alone. In this case, each particle group preferably has a sharp particle size distribution. If the particle groups having a wide particle size distribution are mixed with each other, a complicated arrangement is required to obtain an ideal mixing ratio, because of their particle size distributions overlapping with each other.

When the different particle groups are used as sphere silica particles, it is preferable that the average particle diameter of the larger particle group is 1.4 times or larger than that of its adjacent smaller particle group, and preferably 2.0 times or larger. This arrangement is effective in giving high strength to the potting composition. For example, when a main component of the filler is a particle group having an average particle diameter of 1.5 μm, the additional particle group preferably has an average particle diameter of 1.0 μm or smaller. When the main component of the filler is a particle group having an average particle diameter of 2.5 μm, the additional particle group preferably has an average particle diameter of 1.7 μm or smaller.

In theory, when the sphere silica particles are composed with larger number of particle groups with various average particle diameters, the resultant potting composition has higher strength. However, in reality, sufficiently high strength can be obtained by mixing two to five particle groups. With the use of two to five particle groups, optimum mixing ratio and selection of particle groups can be easily determined.

In general, inorganic filler including sphere silica particles as a main component is included 50 weight percent or more in the potting composition. However, in the present invention, the content of the inorganic filler is preferably 60 weight percent or larger, and more preferably 75 weight percent or larger of the total weight of the thermosetting resin potting composition, in order to give a low thermal expansion ratio to the potting composition. The upper limit of the content of the inorganic filler is desired to be 90 weight percent, because, when the potting composition is substantially the sphere silica particles alone, the potting composition cannot seal an object of sealing.

In the present invention, the thermosetting resin potting composition may contain additional inorganic filler other than the sphere silica particles, as far as it does not adversely affect the feature of the invention. Examples of the additional inorganic filler include pulverized fused-silica and any other inorganic filler other than silica. It is also possible to use sphere silica particles having wide particle size distribution as a main component of an inorganic filler by mixing with a particle group having sharp particle size distribution. With this arrangement, the melt viscosity of the potting composition is lowered and its flowability is improved. According to the present invention, the filler is able to contain 5 to 100 weight percent of the sphere silica particles having an average particle diameter of 0.01 to 10 μm and a coefficient of particle diameter variation of 10 percent or smaller in accordance with the required characteristics of the potting composition.

It is preferable that the inorganic filler containing the sphere silica particles is sufficiently dispersed in the potting composition. Depending on the kind of a thermosetting resin used, it is recommended to use various kinds of coupling agents. Examples of the coupling agents include silane-based, titanate-based, aluminate-based, and zircoaluminate-based coupling agents. Among them, preferable are silane-based coupling agents and aluminate-based coupling agents, and the most preferable are coupling agents having functional groups reactable with the thermosetting resin.

In addition to the sphre silica particles as an inevitable component, the thermosetting resin potting composition contains a thermosetting resin, and a curing agent and a curing accelerator. If necessary, the thermosetting resin potting composition may further contain a mold releasing agent, flame retardant, pigment, plasticizer, a coupling agent, thermoplastic resins, polymerization initiators, vinyl monomers, solvents, liquid rubbers, and the like.

The thermosetting resin may be selected from any thermosetting resins generally used as a potting composition for semiconductor devices, such as an epoxy resin, a phenol resin, an unsaturated polyester resin, a dialylphthalate resin, a polybutadiene resin, an ester cyanate resin, a maleimide compound, and the like. Among them, an epoxy resin is usually used. These may be used alone or in combination of two or more of them.

It is preferable to use an epoxy resin having two or more epoxy groups in its one molecule. Examples of the epoxy resin include a phenol novolak epoxy resin, a cresol novolak epoxy resin, a bisphenol A-type epoxy resin, a bisphenol F-type epoxy resin, a biphenyl-type epoxy resin, a naphthalene-type epoxy resin, an alicyclic-type epoxy resin, a non-cyclic aliphatic epoxy resin, a glycidylester-type epoxy resin, a polyglycol-type epoxy resin, and the like. There may be used alone or in combination of two or more of them.

Examples of the curing agent for epoxy resin include: amine compounds such as primary polyamine, secondary polyamine, tertiary polyamine, aromatic polyamine and their adducts; acid anhydride; a polyamide resin; polysulfide; triphenylphosphine; a phenol resin; a melamine resin; an urea resin, and the like. Among them, a phenol resin is preferable because it gives high heat resistance and moisture resistance to the thermosetting resin potting composition. The use amount of the curing agent is not specifically limited; however, it is general to use the curing agent such that the equivalent of the active hydrogen of the curing agent becomes 0.5 to 1.5 against the epoxy equivalent of the epoxy resin.

Examples of the curing accelerator for epoxy resin include imidazoles, amines, organic phosphines, tetraphenyl boron salts, diazabicycloundecene and its derivatives, and the like. These may be used alone or in combination of two or more of them. The use amount of the curing accelerator is usually 0.01 to 10 weight percent of the total weight of the epoxy resin and the curing agent. When the thermosetting resin potting composition is intended to be applied in the form of liquid to semiconductor material such as underfill materials, the liquid potting composition can be produced by mixing a liquid epoxy resin and liquid polyamine with each other.

In the case of using a thermosetting resin other than the epoxy resin, a curing agent and a curing accelerator may be selected from conventionally known curing agents and curing accelerators suitable for the thermosetting resin.

Hereinafter, the present invention will be further described in detail by way of examples. However, it is to be understood that various changes and modifications will be apparent to those skilled in the art. Therefore, unless otherwise such changes and modifications depart from the scope of the present invention, they should be construed as being included therein.

EXAMPLES

Seven kinds of sphere silica particles shown in Table 1 were mixed with each other at a mixing ratio shown in Table 2 to produce a silica powder. In the Table 1 and Table 2, the sphere silica particles A were "Seahostar KP-P10", B were "Seahostar KP-P30", C were "Seahostar KE-P50", D were "Seahostar KE-P150", and E were "Seahostar KE-P250", all of which were the products of Nippon Shokubai Co., Ltd. The sphere silica particles F and G were the products of other manufactures, respectively.

TABLE 1

| | Property of each sphere silica particles | | | | | | |
|---|---|---|---|---|---|---|---|
| | A | B | C | D | E | F | G |
| Average particle diameter($\mu$m) | 0.11 | 0.31 | 0.55 | 1.57 | 2.49 | 0.44 | 32 |
| Coefficient of variation(%) | 5.0 | 3.9 | 3.5 | 2.5 | 3.0 | 22 | 50 |
| Ratio of longest diameter against shortest diameter of particle | 1.00 | 1.00 | 1.00 | 1.00 | 1.00 | 1.03 | 1.05 |

Then, followings were mixed with 1000 parts by weight of thus-prepared silica powder:

Epoxy resin "YX-4000H", a product of Yuka Shell Co., Ltd.: 170 parts by weight;

Curing agent (phenol-type curing agent) "naphthalene novolak resin OCN7000", a product of Nippon Kayaku Co., Ltd.: 125 parts by weight;

Curing accelerator "Triphenylphosphine", a product of Hokko Chemical Industry Co., Ltd.: 4.3 parts by weight; and A mold releasing agent (natural carnauba wax): 5.2 parts by weight.

The mixture was kneaded with a mixing roll at 90° C. for 10 minutes, and then, was cooled to room temperature. Then, the resultant was crushed, and as a result, an epoxy resin potting composition was produced.

The melt viscosity of the epoxy resin potting composition was measured with a flow tester (a product of Shimadzu Corporation) at 175° C. under load of 10 kg.

Besides the above, the epoxy resin potting composition was transfer-molded at 175° C., and then, was subjected to after-cure at 175° C. for 6 hours to obtain a molded test piece. The bending strength of the test piece was measured under the standard of JIS K-6911. The test result is shown in Table 2.

TABLE 2

| | Mixing ratio of each sphere silica particles (parts by weight) | | | | | | | | Melt viscosity | bending strength |
|---|---|---|---|---|---|---|---|---|---|---|
| | A | B | C | D | E | F | G | Total | (poise) | (kgf/mm$^2$) |
| Example 1 | 100 | 300 | 0 | 600 | 0 | 0 | 0 | 1000 | 250 | 21.0 |
| Example 2 | 100 | 300 | 0 | 0 | 600 | 0 | 0 | 1000 | 270 | 20.0 |
| Example 3 | 200 | 0 | 0 | 300 | 500 | 0 | 0 | 1000 | 300 | 19.0 |
| Example 4 | 100 | 300 | 0 | 0 | 0 | 0 | 600 | 1000 | 450 | 20.0 |
| Example 5 | 50 | 0 | 200 | 550 | 200 | 0 | 0 | 1000 | 230 | 23.0 |
| Example 6 | 50 | 0 | 250 | 600 | 250 | 0 | 0 | 1150 | 350 | 25.0 |
| Example 7 | 0 | 0 | 0 | 0 | 1000 | 0 | 0 | 1000 | 220 | 16.5 |
| Example 8 | 0 | 1000 | 0 | 0 | 0 | 0 | 0 | 1000 | 200 | 15.5 |
| Example 9 | 0 | 0 | 1000 | 0 | 0 | 0 | 0 | 1000 | 210 | 16.0 |
| Com. Ex. 1 | 0 | 0 | 0 | 0 | 0 | 0 | 1000 | 1000 | 800 | 15.0 |
| Com. Ex. 2 | 0 | 0 | 0 | 0 | 0 | 1000 | 0 | 1000 | 600 | 15.5 |
| Com. Ex. 3 | 0 | 0 | 0 | 0 | 0 | 300 | 700 | 1000 | 550 | 17.0 |

As is obvious from Table 2, in Examples 1 to 9, the obtained potting composition had low melt viscosity and good flowability, because the potting composition comprised sphere silica particles A to E having a sharp particle size distribution expressed by the coefficient of particle diameter variation of 10 percent or less.

In addition, in Examples 1 to 6, the sphere silica particles were prepared by mixing a plurality of particle groups having various average particle diameter. In this case, the obtained potting composition had high strength in addition to the low melt viscosity and good flowability.

Contrary to this, in Comparative Examples 1 to 3, the silica powder was prepared by mixing only particle groups having wide particle size distribution expressed by the coefficient of particle diameter variation of larger than 10 percent. In this case, the obtained potting composition had low melt viscosity and poor flowability.

As described above, according to the present invention, the thermosetting resin potting composition has low melt viscosity and good flowability even though it contains large amount of the inorganic filler. When the inorganic filler includes a plurality of particle groups with various average particle diameter, the obtained thermosetting resin potting composition has high strength in addition to the low melt viscosity and good flowability.

What is claimed is:

1. A thermosetting resin potting composition comprising an inorganic filler including sphere silica particles having an average particle diameter of 0.01 to 10 $\mu$m as a main component, wherein the sphere silica particles constitute one or more particle groups, wherein each particle group is defined as consisting of particles having a single average particle diameter and a coefficient of particle diameter variation of 10 percent or less, and wherein when there is more than one particle group, the quotient resulting from dividing the average particle diameter of a particle group by the next largest average particle diameter of another particle group is at least 1.4.

2. The thermosetting resin potting composition according to claim 1, wherein the sphere silica particles comprise two or more particle groups.

3. The thermosetting resin potting composition according to claim 1 wherein the content of the inorganic filler is 60 to 90 weight percent of the total weight of the potting composition.

4. The thermosetting resin potting composition according to claim 1 wherein the content of the sphere silica particles is 5 to 100 weight percent of the total weight of the inorganic filler.

5. The thermosetting resin potting composition according to claim 3, wherein the content of the sphere silica particles is 5 to 100 weight percent of the total weight of the inorganic filler.

6. The thermosetting resin potting composition according to claim 2 wherein the content of the inorganic filler is 60 to 90 weight percent of the total weight of the potting composition.

7. The thermosetting resin potting composition according to claim 2 wherein the content of the sphere silica particles is 5 to 100 weight percent of the total weight of the inorganic filler.

8. The thermosetting resin potting composition according to claim 6 wherein the content of the sphere silica particles is 5 to 100 weight percent of the total weight of the inorganic filler.

9. The thermosetting resin potting composition according to claim 1 wherein the coefficient of particle diameter variation of at least one particle group differs from the coefficient of particle diameter variation of a particle group having the next largest particle diameter.

10. A thermosetting resin potting composition comprising an inorganic filler including sphere silica particles as a main component, wherein the sphere silica particles have at least one peak in the variation of particle diameter, and wherein at least one peak is in the range of 0.01 to 10 $\mu$m, and this peak has a coefficient of 10 percent or less.

11. A thermosetting resin potting composition comprising an inorganic filler including sphere silica particles having an average particle diameter of 0.01 to 10 $\mu$m as a main component, wherein the sphere silica particles including at least one particle group in diameter variation and coefficient of particle diameter variation of 10 percent or less, and wherein when there is more than one particle group whose coefficient of particle diameter is 10 percent or less, the quotient resulting from dividing the average particle diameter of a particle group by the next largest average particle diameter of another particle group is at least 1.4.

12. The thermosetting resin potting composition according to claim 11, wherein the sphere silica particles comprise two or more particle groups.

13. The thermosetting resin potting composition according to claim 11, wherein the content of the inorganic filler is 60 to 90 weight percent of the total weight of the potting composition.

14. The thermosetting resin potting composition according to claim 11, wherein the content of the sphere silica particles is 5 to 100 weight percent of the total weight of the inorganic filler.

15. The thermosetting resin potting composition according to claim 11, wherein said particle diameter of at least two adjacent pairs has different diameter variation.

16. A thermosetting resin composition comprising an inorganic filler including sphere silica particles as a main component, wherein the sphere silica particles having at least one peak in the variation of particle diameter, and wherein at least one peak is in the range of 0.01 to 10 $\mu$m, and coefficient of this peak is 10 percent or less.

* * * * *